(12) United States Patent
Kovacs et al.

(10) Patent No.: US 6,542,819 B1
(45) Date of Patent: Apr. 1, 2003

(54) GEOLOCATION OF MOBILE DEVICES

(75) Inventors: Ernö Kovacs, Stuttgart (DE); Oliver Schramm, Wolfschlugen (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/762,506

(22) PCT Filed: Apr. 13, 2000

(86) PCT No.: PCT/EP00/03329
§ 371 (c)(1),
(2), (4) Date: Apr. 20, 2001

(87) PCT Pub. No.: WO00/75682
PCT Pub. Date: Dec. 14, 2000

(30) Foreign Application Priority Data

Jun. 8, 1999 (WO) ................................. PCT99/03960

(51) Int. Cl.⁷ .............................................. G01S 21/00
(52) U.S. Cl. ..................... 701/213; 701/216; 701/217; 701/200
(58) Field of Search ................................. 701/200, 213, 701/216, 217, 219, 220, 214, 24; 342/357

(56) References Cited

U.S. PATENT DOCUMENTS

| | | | |
|---|---|---|---|
| 5,488,559 A | 1/1996 | Seymour | 701/208 |
| 5,906,655 A | 5/1999 | Fan | 701/216 |
| 5,982,324 A * | 11/1999 | Watters et al. | 342/357.06 |
| 6,160,837 A * | 12/2000 | Bruno et al. | 375/130 |

* cited by examiner

Primary Examiner—William A. Cuchlinski, Jr.
Assistant Examiner—Marthe Y. Marc-Coleman
(74) Attorney, Agent, or Firm—Frommer Lawrence & Haug LLP; William S. Frommer; Gordon Kessler

(57) ABSTRACT

A technique for the determination of the current position of a mobile device based on a plurality of geolocation positioning services is proposed. Different position information sources are accessed wirelessly to acquire position information. The position information thereby comprises respectively at least information about the position of the corresponding position information source. At least one of the plurality of accessed position information sources is selected depending on the values of operation parameters, such as for example availability, cost, speed, power consumption and quality of the position information, wherein the operation parameters are associated with the different position information sources. The position of the mobile device is then determined based on the position information of the at least one selected position information source.

13 Claims, 4 Drawing Sheets

GEOLOCATION OF MOBILE DEVICES

BACKGROUND OF THE INVENTION

The present invention relates to a method for the determination of the current position of a mobile device, to a software element, a mobile device comprising such a software element as well as to a mobile device comprising means for the determination of its current position.

The present invention generally relates to the field of mobile computing, hand-held computers, wireless communication and mobile multimedia middleware. Particularly it relates to selecting and appropriate location determination method according to a stored set of operation parameters describing the different location determination's devices available.

Future hand-held devices will include a set of different location devices helping to determine the current geo-position of the mobile device. The best known type of devices are GPS (or D-GPS) receivers. Others are infrared beacons for indoor use or GSM cell broadcast for transmitting the area code to which the mobile phone belongs. In the future additional means like the GSM location service or microsensor techniques will be available.

Most devices currently used are only including one or two of this position means. In the future there will be problems when a plurality of positioning devices will be available.

OBJECTS OF THE INVENTION

Therefore, the present invention has as an object to provide for a technique for handling a plurality of accessable geolocation positioning devices.

This object is achieved by means of the features of the independent claims. The dependent claims develop further the central idea of the present invention.

SUMMARY OF THE INVENTION

Therefore, according to the present invention a method for the determination of the current position of a mobile device is provided. The method comprises the step of accessing wirelessly a plurality of different position information sources for acquiring position information, the position information comprising respectively at least information about the position of the corresponding position information source. At least one of the plurality of accessed position information sources is selected depending on the values of operation parameters associated with the different position information sources. The position of the mobile device is then determined based on the position information of the at least one selected position information source.

The operation parameters can comprise at least one of availability, cost, speed, power consumption and quality of the position information service.

New position information sources to be accessed can be added dynamically during operation.

A position information source can be selected manually.

The acquired position information of the at least one position information source and the corresponding operation parameters can be stored.

A set of operation parameters used for the selection step defines a selection policy, wherein different selection policies can be set.

In case more than one position information source is selected, the corresponding position information can be combined.

The invention furthermore proposes a software element executing, when loaded in a mobile device, a method as set forth above.

The invention furthermore proposes a mobile device comprising such a software element.

According to the present invention a mobile device comprising means for the determination of its current position is provided. The means for the position determination comprise means for wirelessly accessing a plurality of different position information sources for acquiring position information. The position information comprises respectively at least information about the position of the corresponding position information source. The means for the position determination comprise furthermore means for selecting at least one of the plurality of accessed position information sources depending on the values of operation parameters associated with the different position sources. Furthermore, means for determining the position of the mobile device based on the position information of the at least one selected position information source is provided.

The operation parameters can be transmitted along with the position information or can be known in advance to the mobile device. Furthermore, the operation parameters can be derived from the transmission of the position information itself (for example in the case of the periodicity of the transmission, the accuracy etc.).

Further objects, features and advantages of the present invention will come clear from the following description of preferred embodiments taken into conjunction with the figures of the enclosed drawings.

DETAILED DESCRIPTION OF THE PREFERRED EMBODIMENTS

Figure 1:
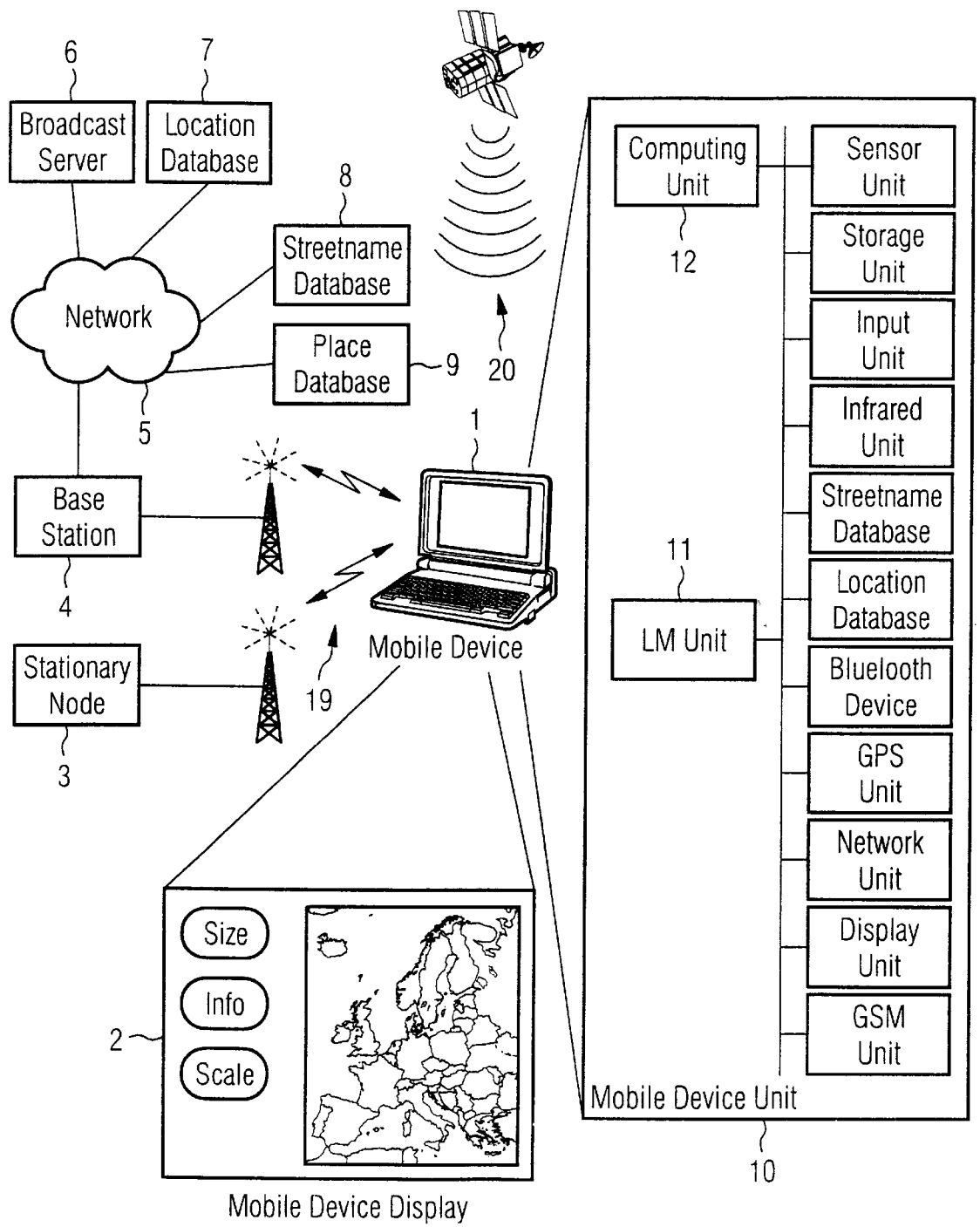
FIG. 1 shows the overlook over the overall system.

This invention describes a LM (location manager) unit that gives transparent access to different location devices. The LM unit selects an appropriate location device and reads the related information. In addition to the position information, the LM unit provides information about the current operating parameter (e.g. the speed of the location update, the accuracy, the involved cost, etc.).

LM Unit

The LM unit consists of several subunits and some external units which are attached to the LM unit. These external units include the location devices itself. For example, if the LM unit provides access to a GPS receiver, the GPS receiver itself is attached as an external unit.

The LM unit consists of the LM Factory unit, the LM API unit, the LM Storage unit, the LMSS (Location Manager Selection Service) unit and several additional LD (Location Driver) units. There is one LD unit for each external unit attached, but there might be LD units without external attached location device units. For example, the GPS-LD unit contains the components necessary to access an external GPS unit and to retrieve the current position from that device.

LM Factory

LD units can be added dynamically during the runtime of the system, for example when new location devices are attached to the LM unit. The LD Factory unit is managing the configuration of different units and the adding and removing of LD units. The LM Loader unit loads the additional LD units.

LM Storage Unit and LM API Unit

The LM Storage unit stores the latest retrieved location together with a set of operation parameter. The parameter describe the quality of the stored information, e.g. the accuracy, the time of the latest update, the accumulated cost resulting from LM operation, and more. The LM API units comprises two subunits, the LM Location API unit and the LM TupleSpace API unit. Both subunits access the LM Storage unit for retrieving the current location information and operating parameters. The LM Location API unit provides a location-specific interface with operation for each piece of location information available. The LM TupleSpace API unit provides a high-level interface using the TupleSpace model. In this model, the interface consists of operations to manipulate a set op tuple (key/value pairs). Each tuple is mapped to an appropriate parameter stored in the LM Storage unit.

Some operating parameters can be set through the LM API units and will influence the LMSS selection policy and the LD unit operation.

TABLE 1

TupleSpace API

| Method | Description |
|---|---|
| Set | Sets a parameter value |
| Get | Retrieves a parameter value |
| Mset | Sets a set of parameter values |
| Mget | Retrieves a set of parameter values |
| Mop | Execute a mixture of several set and get operations |
| GetAttributes | Returns a list of Attributes |

TABLE 2

Location API

| Method | Description |
|---|---|
| GetLongitude | Retrieves the current longitude |
| GetLatitude | Retrieves the current latitude |
| GetAltitude | Retrieves the current altitude |
| SetLongitude | Set the current longitude and switch to manual input |
| SetLatitude | Set the current latitude and switch too manual input |
| SetAltitude | Set the current Altitude and switch to manual input |
| SetMode | Switch between different modes by setting the LM selection policy |
| GetMode | Retrieves the current mode |

LD Units

A LD unit consists of a LD API unit, a LD Parameter unit and a LD Interface unit. The LD API unit is used to access a LD unit. A LD unit provides a set of operating parameter that describes the service offered by the LD unit. This set is contained the LD Parameter subunit. The LMSS unit accesses the LD Parameter units of the different LD units to determine the currently used LD unit. The LD interface unit communicates with the external location device units through whatever means is required by these external units. The LD units ensure that the parameters stored in the LD Parameter unit is matched or correctly updated. The operation of the LD unit and the attached location device units can be influenced through setting LD paraneters. This is done by using the LD API unit.

LD units determine the current position and offer this information through the LD API unit. This can be either a unsolicited message (an event) thrown when the user has changed its position significantly or just stored for subsequent retrieval.

LMSS Unit

The LMSS unit consists of the LMSS Policy unit, the LMSS Executer unit and the LMSSS Combiner unit. The LMSS Policy unit manages different selection policy used to select one or more of the current available LD units. The LMSS Policy unit can store a set of different selection policies. Additional policies can be loaded dynamically into the LMSS Policy unit. The LMSS Policy unit selects the current used policy based on the current operation parameter of the mobile device, the set op LM operating parameters stored in the LM Storage unit and on the user's input. For example, if the mobile device is in a sleep modus, the LMSS Policy unit selects a policy that saves power.

The LMSS Executer is an additional subunit of the LMSS unit that executes the selected policy. Whenever a new LD driver is selected, the LMSS Executer activates the LD unit through the respective LD API unit. This activation allows LD units to access external units and retrieve the required information according to the current LD parameter sets. Some selection policies might influence the LD parameters. This will be done by the LMSS Executer through setting parameters in the respective LD parameter unit.

If the current LMSS selection policy allows more than one LD unit to determine the current position, the LMSS Combiner will combine the results and determine the operating parameter of the LM unit. The resulting location information and the operating parameters are stored in the LM Storage unit.

Figure 2:
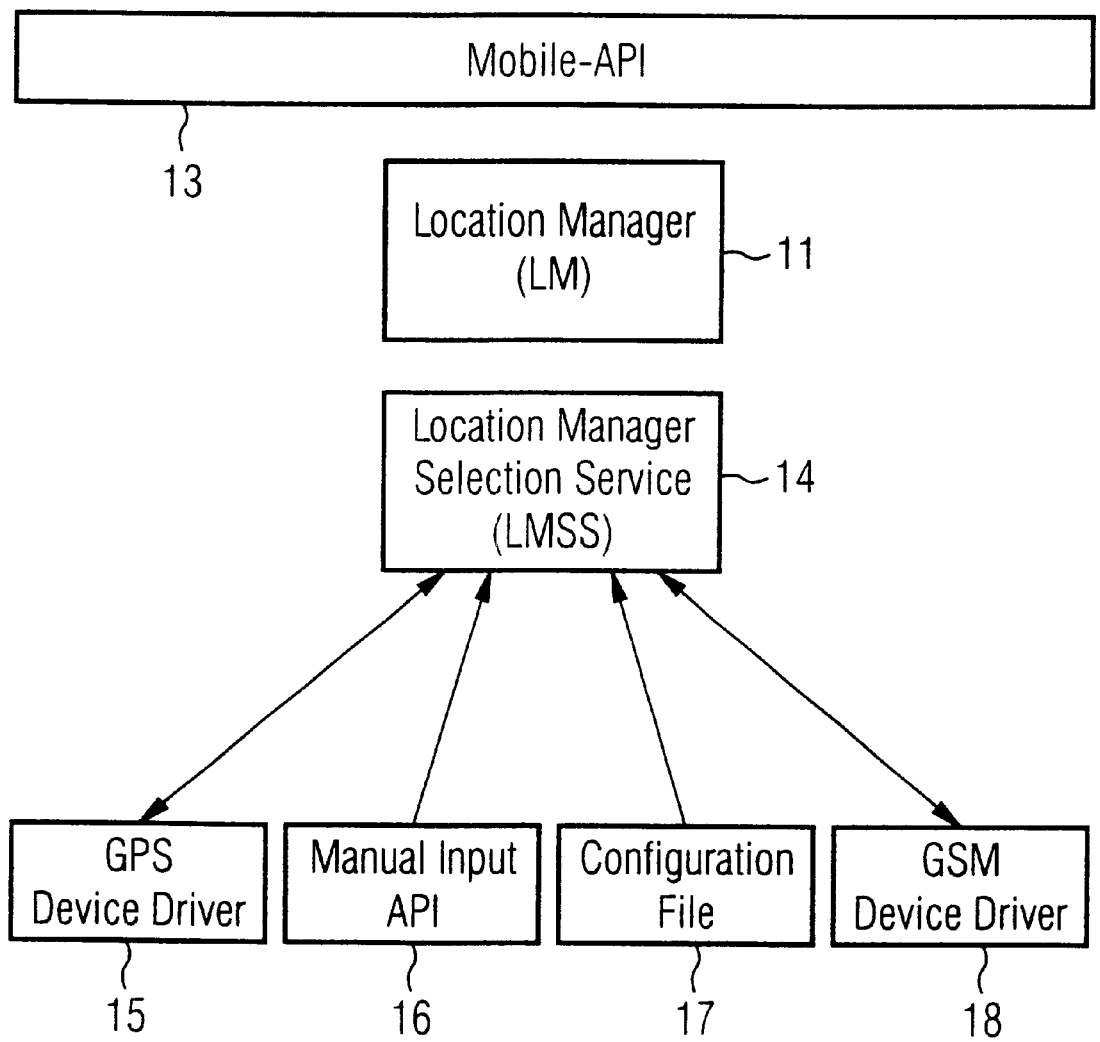
FIG. 2 shows a logical representation of a local manager unit.

As in FIG. 2 explained the Location Manager is based on the Location Manager Selection Service (LMSS). The task of this component is to offer the best location dependent information out of different sources. These are the different device driver, possible manual input—or for stationary use a configuration file can be used. So the LMSS can ask each device driver component for position information and offer the best to the above location manager. The quality of the position information can be determined based on the quality of Location description that is associated with each position information.

EXAMPLE

LM with a Single LD (Location Driver)

The simplest LM contains only a single LD. In this case, the LMSS selection policy will activate this LD unit (if required and appropriate according to the LM operating parameters) and retrieve the information from there. If we assume that the attached location device is a GPS receiver, then the LM unit will work as follows. The LMSS will select the used policy from the LMSS Policy unit. The LMSS Executer unit will activate the GPS LD unit. The GPS LD unit will activate the external GPS location device. The GPS receiver unit will send periodically position information through the GPS LD Interface unit. The LD unit will process this information and store it together with the operating parameters in the LD Parameter. If requested by one of the LD operating parameters, it will further inform the LMSS about new positions. The LMNSS will store this information in the LMSS Storage unit. If requested by an operating parameter of the LM unit, it will inform applications about the new position through the LM API unit.

LM with More Than One LD

In this case, the LMSS Policy unit has to determine an appropriate LD device based on operating parameters like availability/status of the attached external devices, and more. If the LD policy units selects more than one LD devices, the LD Combiner has to combine the results of both LD units.

Currently Known LD Units

The following table consists of a set of currently known LD units with respect to the presented invention:

TABLE 3

Known LD units

| | |
|---|---|
| GPS LD unit | A LD unit using an external attached GPS receiver. Depending on the kind of GPS receiver and its features, the GPS LD unit will configure the GPS receiver to deliver certain kind of output. |
| GSM LS LD unit | Future GSM versions will support the GSM Location Service. With this service, each GSM phone owner can determine his position by calling a Location Service center. |
| ConfigFile LD unit | The config file LD unit reads its location and other operating parameters from a config file. |
| ManualInput LD unit | The manual input LD unit let the user set his current position manually. |
| WellKnownPlaces LD unit | This LD unit maps well-known places to geographic positions. The user will input the name of the place. The LD unit will lookup this place an associated geographic information in a database. The database can be stored locally or on the network. A special kind of this LD unit is the Streetname LD unit that simply maps street names to position information. |
| Infrared LD unit | Small, inexpensive Infrared beacons can transmit the current position to mobile devices passing by. |
| Network Broadcast LM Unit | Cellular networks or networks with a limited geographic range can broadcast the position of a base station or a stationary node over the network. A mobile node can safely assume that it is close to this geographic position. |
| Ad-hoc Network LM unit | Ad-hoc networks are built on the fly using technologies like Bluetooth or future wireless networks. For example, car-to-car communication can be established in this way. This can be used to that powerful and well-equipped nodes can offer services to other nodes. One of this service could be the location information. The accuracy of the information can be derived from the means of communication. |
| Tiangulation LM unit | Using network specific triangulation mechanism, the wireless network can determine the position of the user. This information can be transmitted to the mobile node directly. |

Explanation of Figures

FIG. 1 shows the overall system. The system comprises the mobile device 1 with a display 2, the (wireless) access networks 19, the fixed network 5, base station 4 in the wireless network 19, additional stationary nodes 3 attached to the wireless network 19, a fixed network 20 (like the Internet or the GSM network), a streetname database 8, a place database 9, a broadcast server 6, a location database 7, the display 2 of the mobile device, location-based applications 11, and the set of sub-units which might be part of the mobile device. The sub-units comprised:

the computing unit 12—executing the applications running on the mobile device the sensor unit—measuring speed, acceleration and other parameters the storage unit—storing information like databases, maps, etc.

input units—units that are used by the human user for inputting information (e.g. the keyboard, a pen, a touch screen, etc.)

infrared unit—a unit to communicate using infrared bluetooth device unit—a unit to communicate using bluetooth streetbase database unit—a (local) database of streets location database unit—a (local) database of known locations a GPS unit—a unit to measure the position using GPS or D-GPS a network unit—a unit containing network access units like Ethernet, GPR, GSM data services, Token Ring, or else)

display unit—a way to display information to the user

A mobile client which has direct access to a GPS receiver can use this information for his services. But when a mobile client is used in a house (indoor) then it is unwise to get location dependent information through the GPS receiver, because the deviation is to great for a conducive use.

A better solution will be to connect to a mobile gateway, which can offer the information with a higher QoL. This concept is realized through the L-Broadcast mechanism. The L-Broadcast mechanism consists of two components—The Broadcast-Server and the Broadcast-Client.

The Broadcast-Server is a separate component while the Broadcast-Client is a so-called device driver of the LMSS. The basically idea is that when a mobile client enters a house the LMSS receives position information with a very high QoL. This information can be used by a mobile client service.

The Broadcast-Server is a service in the mobile gateway. It gets position information from a Location Manager, which may be stationary and can possible use the configuration file.

There are two different ways how the Broadcast-Client and the Broadcast-Server can communicate with each other.

In this model the server broadcasts position information in a definite interval and clients listen on a multicast socket. This model is a very straightforward realization of the problem. A drawback is that the server sends information even there is a client or not.

The second model is the inverse of the previous. Here the mobile client broadcast a request when he needs information about his location. The request contains information about the client like his machine address and communication port. A server who receives that request on a multicast socket can send a location information directly to the client. This model has the advantage that the client can determine when information is send over the network.

FIG. 2 shows a logical view of the LM unit 11. The LM unit 11 provides a API (Application Program Interface) 13 which might be part of a Mobile-API. The LM unit 11 executes the operation requests receives through the API 13. It used the services of a LMSS 14. The LMSS 14 selects among different LD units (GPS 15, Manual Input 16, Config Files 17, GSM Location services 18.

Figure 3:
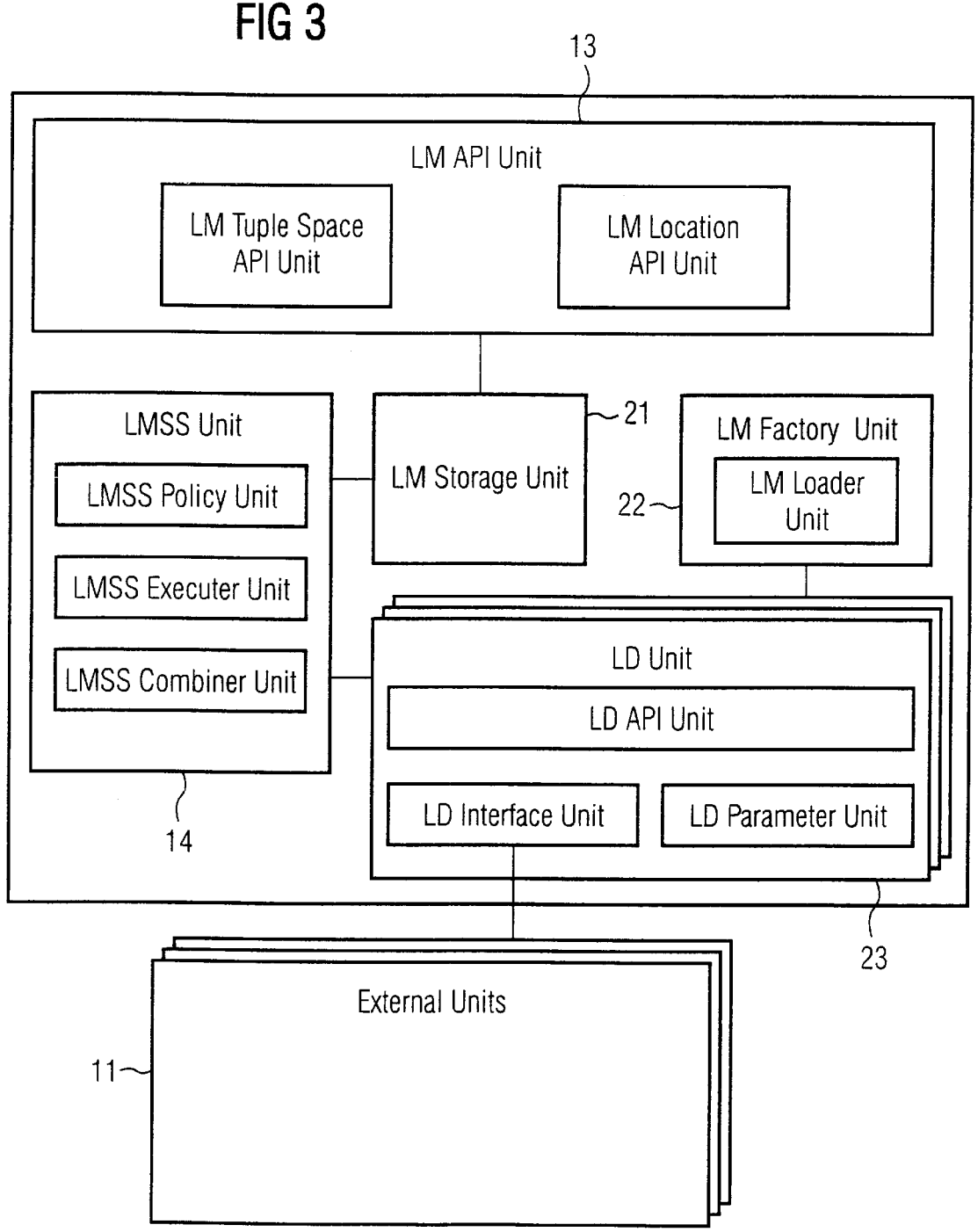
FIG. 3 shows the internal structure of a local manager unit.

FIG. 3 explains the LM unit 11. The LM unit 11 is attached to a set of external units. This external units provide location information. The LM unit consists of the LM API unit 13, the LMSS unit 14, the LM Storage unit 21, the LM Factory unit 22, and one or more LD units 23.

The LM API unit 13 consists of the LM TupleSpace API unit and the LM Location API unit.

The LMSS unit 14 consists of the LMSS policy unit, the LMSS Executer unit, and the LMSS Combiner unit.

Figure 4:
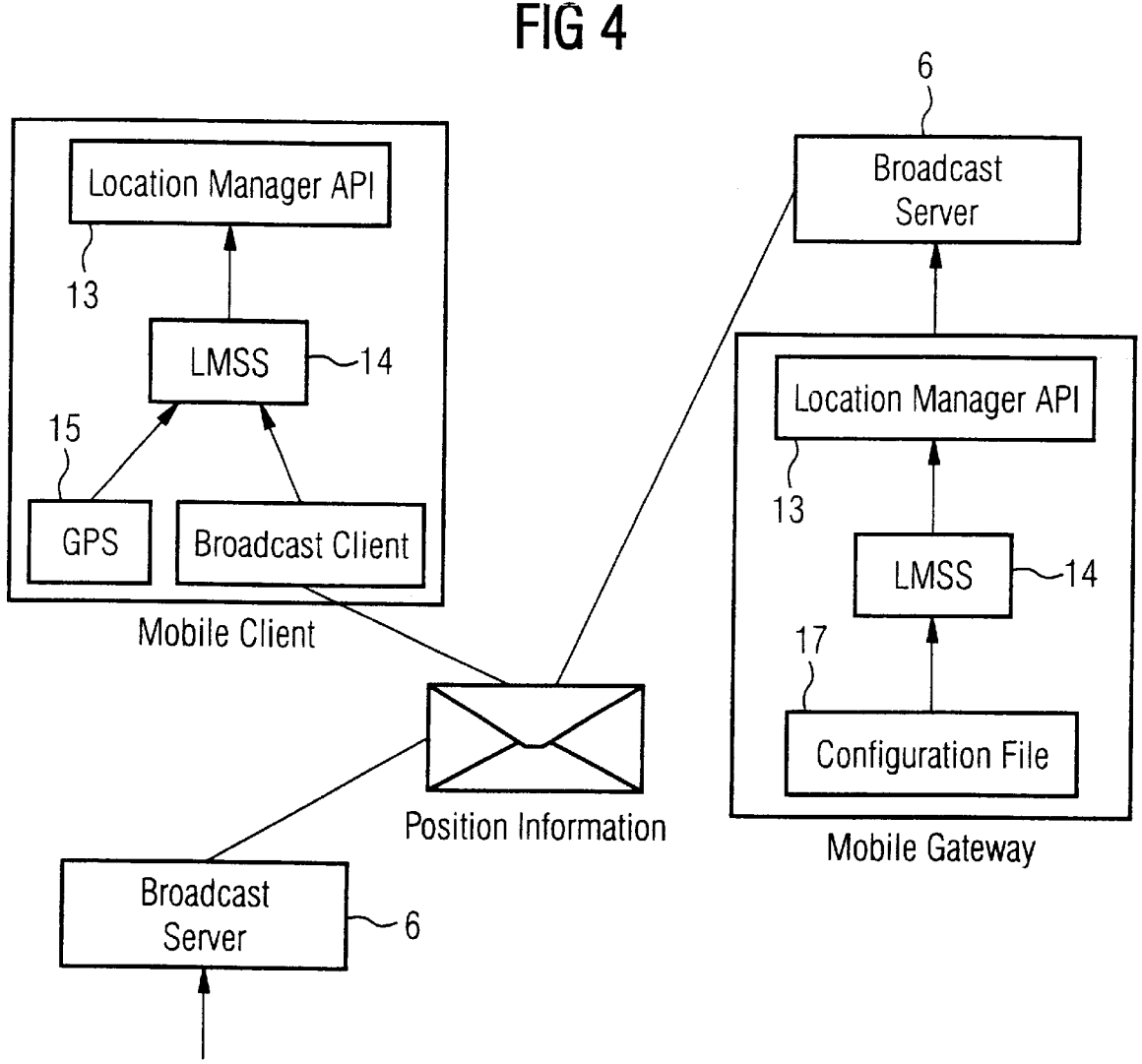
FIG. 4 shows the idea of a so-called L-Broadcast mechanism.

FIG. 4 shows the idea of the Location-Broadcast mechanism. A mobile client connects to a Broadcast-Server on a mobile gateway or another mobile client. The LMSS of the mobile client can choose the best available location information based on the QoL. When the mobile client enters a house he can broadcast via infrared and gets position information from the next, may be stationary mobile gateway, which reads the location information itself from a configuration file.

The invention proposes techniques for determining the geolocation of mobile devices using a variety of different location devices. The invention presents a technique for combining position information derived from a plurality of different position devices (position information sources) based on quality information about the position devices. The derived position information is offered through a standard API (application program interface) unit to application of the mobile device. The API comprises a high-level, TupleSpace like API unit and a low-level direct access API unit. The invention uses further information (operation parameters) known about the position devices to select a suitable device. A special mode for manual input is provided. The unit includes a plurality of different location determination devices. Each device is described through a set of operation parameters defining the quality of the location information (e.g. the accuracy, the cost, the availability of the device and much more). This information is taken to select the most appropriate location driver. Furthermore, the set of available location devices can be enhanced dynamically.

The main advantageous differences between the invention and the state of the art is that different location devices can be used, a selection can be effected based on operation parameters like availability, cost, speed, accuracy, and the system is dynamically extensible by adding new location devices in operation. Furthermore, the invention allows to manually select the appropriate location driver and to include the newly loaded driver directly into the computation of the unit.

According to the invention new local manager devices can easily be integrated. The position information is augmented with quality information. Small mobile devices can rely on the services of better equipped nodes. Outdoor and indoor location services can be better integrated.

What is claimed is:

1. Method for the determination of the current position of a mobile device, comprising the steps of:
   accessing wirelessly a plurality of different position information sources for acquiring position information, the position information comprising respectively at least information about the position of the corresponding position information source,
   selecting at least one of the plurality of accessed position information sources depending on the values of operation parameters associated with the different position information sources, a set of operation parameters used for this selection defining a selection policy, wherein one different selection policy can be set, and
   determining the position of the mobile device based on the position information of the at least one selected position information source.

2. Method according to claim 1, characterized in that the operation parameters comprise at least one of availability, cost, speed, power consumption, and quality of the position information.

3. Method according to claim 1, characterized in that new position information sources to be accessed are added dynamically during operation.

4. Method according to claim 1, characterized in that the acquired position information of the at least one position information sources and the corresponding operation parameters are stored.

5. Method according to claim 1, characterized in that in case more than one position information sources are selected, the corresponding position information is combined.

6. Method for the determination of the current position of a mobile device, comprising the steps of:
   accessing wirelessly a plurality of different position information sources for acquiring position information, the position information comprising respectively at least information about the position of the corresponding position information source,
   manually selecting at least one of the plurality of accessed position information sources depending on the values of operation parameters associated with the different position information sources, and
   determining the position of the mobile device based on the position information of the at least one selected position information source.

7. A software program for operating a mobile device, for determining the current position of the mobile device, the software program including instructions for:
   accessing wirelessly a plurality of different position information sources for acquiring position information, the position information comprising respectively at least information about the position of the corresponding position information source,
   selecting at least one of the plurality of accessed position information sources depending on the values of operation parameters associated with the different position information sources, a set of operation parameters used for this selection defining a selection policy, wherein one different selection policy can be set, and
   determining the position of the mobile device based on the position information of the at least one selected position information source.

8. Mobile device comprising means for the determination of its current position, comprising:
   means for wirelessly accessing a plurality of different position information sources for acquiring position information, the position information comprising respectively at least information about the position of the corresponding position information source, a set of operation parameters used for this selection defining a selection policy, wherein one different selection policy can be set,
   means for selecting at least one of the plurality of accessed position information sources depending on the values of operation parameters associated with the different position information sources, and
   means for determining the position of the mobile device based on the position information of the at least one selected position information source.

9. Mobile device according to claim 8, characterized in that
   the operation parameters comprise at least one of availability, cost, speed, power consumption, and quality of the position information.

10. Mobile device according to claim 8, characterized by
    means for dynamically adding new position information sources to be accessed during operation.

11. Mobile device according to claim 8, characterized by
    a storage unit for storing the acquired position informa tion of the at least one position information sources and the corresponding operation parameters.

12. Mobile device according to claim 8, characterized by processing means combining, in case more than one position information sources are selected by the selection means, the corresponding position information.

13. Mobile device comprising means for the determination of its current position, comprising:

means for wirelessly accessing a plurality of different position information sources for acquiring position information, the position information comprising respectively at least information about the position of the corresponding position information source, means for manually selecting at least one of the plurality of accessed position information sources depending on the values of operation parameters associated with the different position information sources, and means for determining the position of the mobile device based on the position information of the at least one selected position information source.

* * * * *